(12) United States Patent  (10) Patent No.: US 9,098,752 B2
Huntzicker  (45) Date of Patent: Aug. 4, 2015

(54) VEHICLE PATH ASSESSMENT

(71) Applicant: GM Global Technology Operations LLC, Detroit, MI (US)

(72) Inventor: Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 13/963,531

(22) Filed: Aug. 9, 2013

(65) Prior Publication Data

US 2015/0043779 A1    Feb. 12, 2015

(51) Int. Cl.
*G06K 9/00* (2006.01)
*B60Q 9/00* (2006.01)

(52) U.S. Cl.
CPC ............ *G06K 9/00805* (2013.01); *B60Q 9/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,309,137 | A * | 5/1994 | Kajiwara | 340/436 |
| 5,410,346 | A * | 4/1995 | Saneyoshi et al. | 348/116 |
| 7,050,909 | B2 * | 5/2006 | Nichols et al. | 701/301 |
| 8,098,889 | B2 * | 1/2012 | Zhu et al. | 382/103 |
| 8,234,065 | B2 * | 7/2012 | Harayama et al. | 701/446 |
| 8,332,097 | B2 * | 12/2012 | Chiba et al. | 701/36 |
| 8,421,859 | B2 * | 4/2013 | Zhang et al. | 348/119 |
| 8,872,919 | B2 * | 10/2014 | Watanabe et al. | 348/148 |
| 2005/0171654 | A1 * | 8/2005 | Nichols et al. | 701/15 |
| 2008/0071474 | A1 * | 3/2008 | Harayama et al. | 701/211 |
| 2008/0273752 | A1 * | 11/2008 | Zhu et al. | 382/103 |
| 2009/0157268 | A1 * | 6/2009 | Chiba et al. | 701/53 |
| 2009/0268946 | A1 * | 10/2009 | Zhang et al. | 382/104 |
| 2012/0166080 | A1 * | 6/2012 | Hung et al. | 701/448 |
| 2013/0215270 | A1 * | 8/2013 | Murashita et al. | 348/148 |

* cited by examiner

*Primary Examiner* — Anand Bhatnagar
(74) *Attorney, Agent, or Firm* — BrooksGroup

(57) ABSTRACT

A number of variations include a vehicle path assessment system.

20 Claims, 3 Drawing Sheets

VEHICLE PATH ASSESSMENT

TECHNICAL FIELD

The field to which the disclosure generally relates includes vehicle path assessment systems.

BACKGROUND

Conventional vehicle path assessment systems treat every scenario as a new event and use general rules for assessing risk. These may require expensive equipment but may nevertheless be based on rough approximation.

SUMMARY OF ILLUSTRATIVE VARIATIONS

A number of variations may include a method comprising: determining if objects are in a vehicle path comprising: producing at least one of a first image and/or first amount of image data for an area; determining a vehicle path and overlaying it on the at least one first image and/or representing it within the first amount of image data; producing at least one of a second image and/or second amount of image data for the area; using the at least one first image and/or first amount of image data and correlating it to the at least one second image and/or second amount of image data to determine objects which may be displaced in the at least one second image and/or second amount of image data; determining whether objects which are displaced are in the vehicle path; producing a notification of objects in the vehicle path via capable hardware based upon the outcome of the determining whether objects which are displaced are in the vehicle path.

Other illustrative variations within the scope of the invention will become apparent from the detailed description provided hereinafter. It should be understood that the detailed description and specific examples, while disclosing optional variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1A:
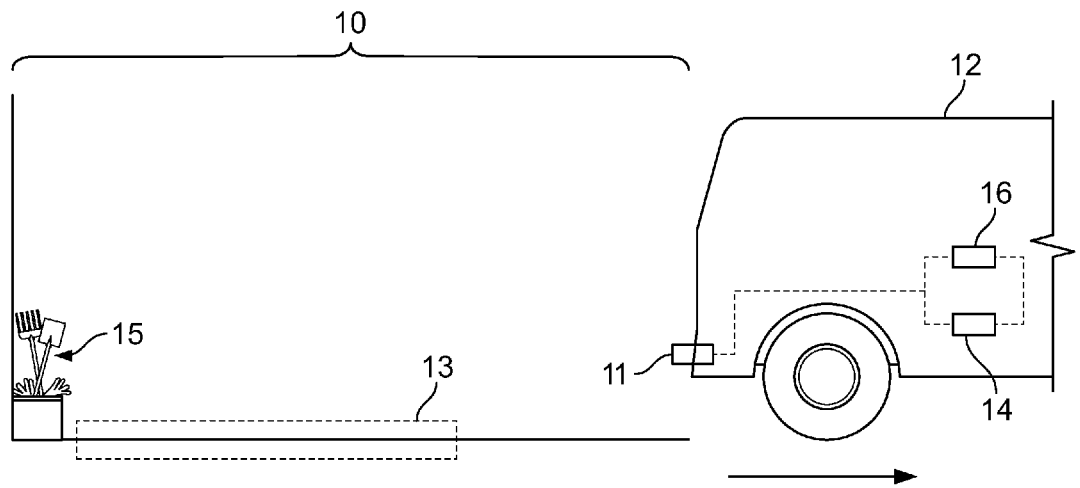
FIG. 1a illustrates a vehicle, having imaging hardware, pulling out of a familiar parking space
Figure 1B:
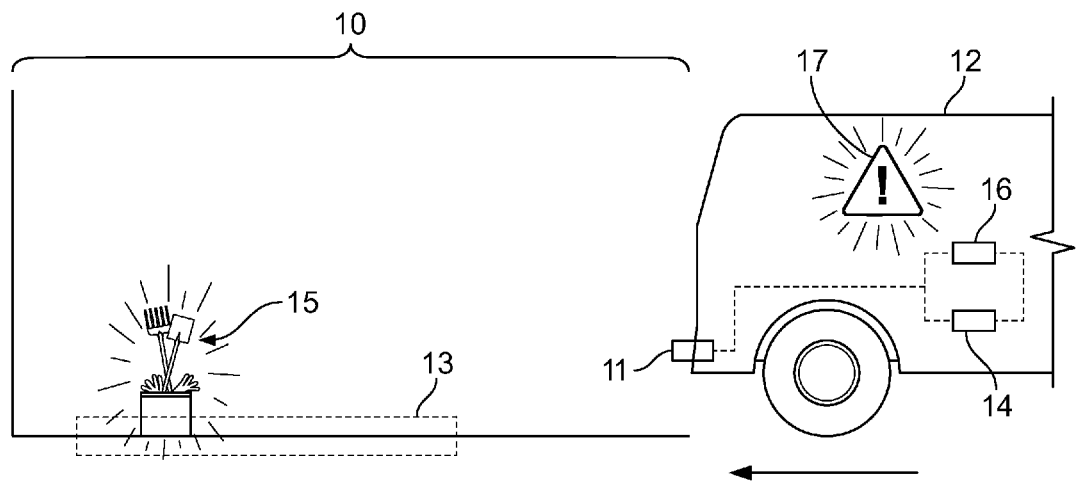
FIG. 1b illustrates a vehicle, having imaging hardware, backing into a familiar parking space

The following description of the variations within the scope of the invention is merely illustrative in nature and is in no way intended to limit the scope of the invention, its application, or uses.

A number of illustrative variations are fully or partially illustrated in FIGS. 1a, 1b, 2a, 2b, and 2c. A number of variations may involve the situation in which a vehicle 12 has pulled out of a familiar parking space 10 by a sufficient distance from where it was previously backed in and parked, for example, as shown in the non-limiting illustration of FIG. 1a. A first image 20 of the familiar parking space is created by imaging hardware 11 and a space that the vehicle 12 is expected to occupy after backing up is overlaid onto the first image 20. For purposes of this illustrative variation, this overlay is referred to as the vehicle path 13. This first image 20 is then stored in a storage device 16. When the vehicle is to be returned and backed into its former, familiar parking space 10, the imaging hardware 11 once again creates an image of the familiar parking space 10 such that the perspective of the first and second images are sufficient for comparison, for example, as shown in the non-limiting illustration of FIG. 1b. This second image 30 is then matched to the first image 20 such that the vehicle path 13 which was overlaid on the first image 20 can be reasonably correlated to the second picture. A controller 14 which may be aboard the vehicle then compares the second image 30 to the first image 20 in order to determine whether there is an object 15 in the vehicle path 13. If there is at least one object 15 in the vehicle path 13, a notification 17 is produced by the vehicle.

Figure 2A:
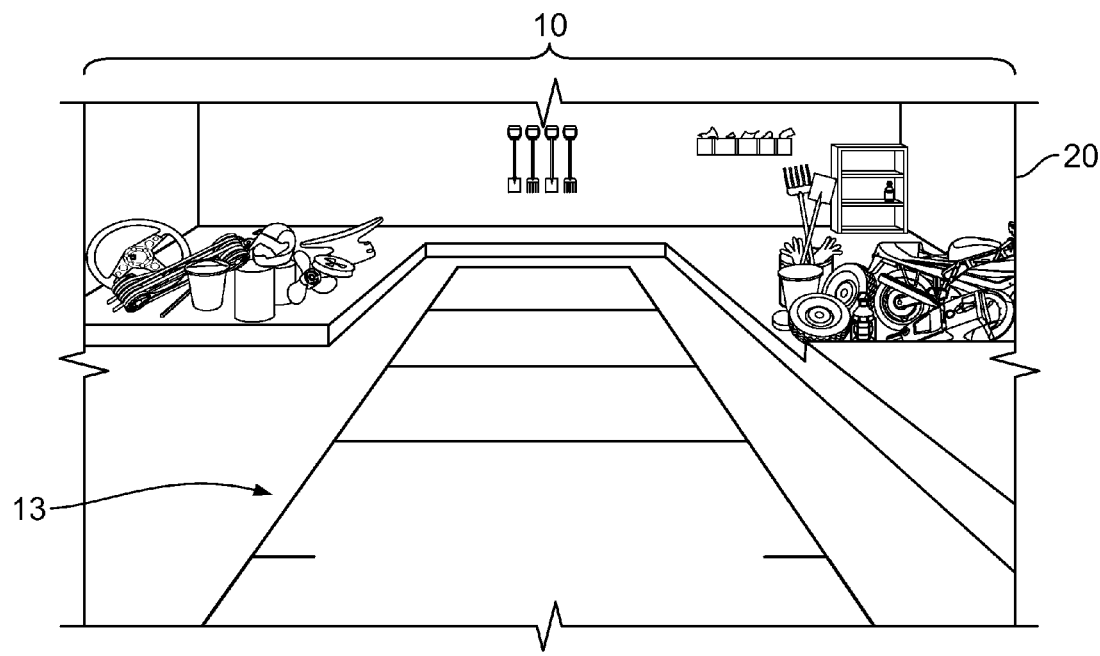
FIG. 2a illustrates a vehicle path overlaid on an image
Figure 2B:
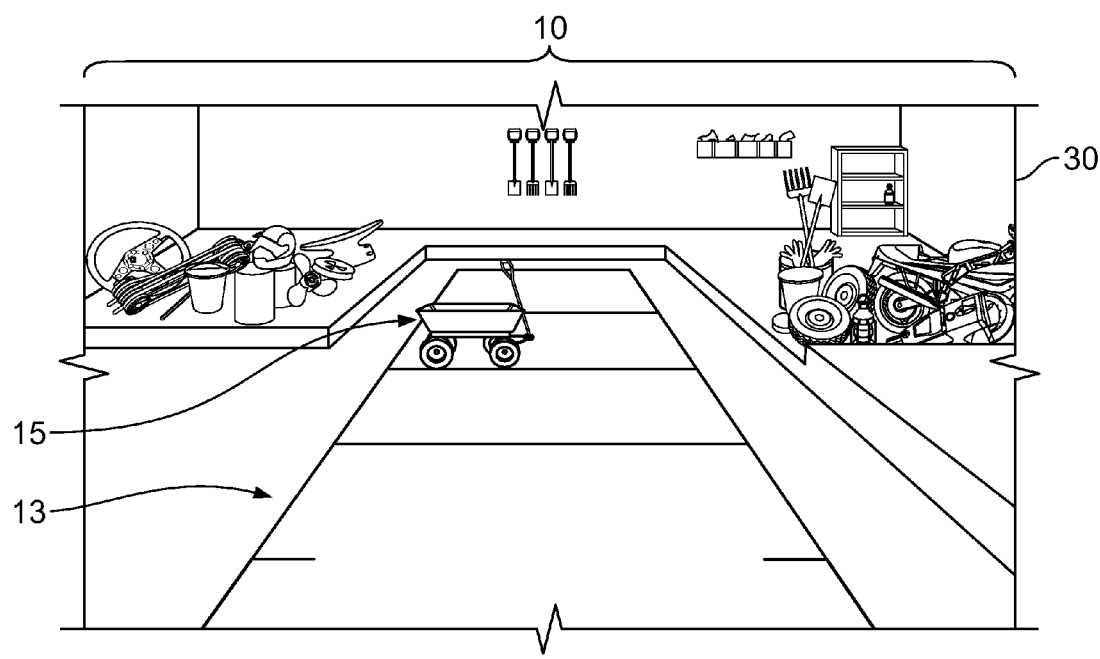
FIG. 2b illustrates an object in the vehicle path which is overlaid on the image
Figure 2C:
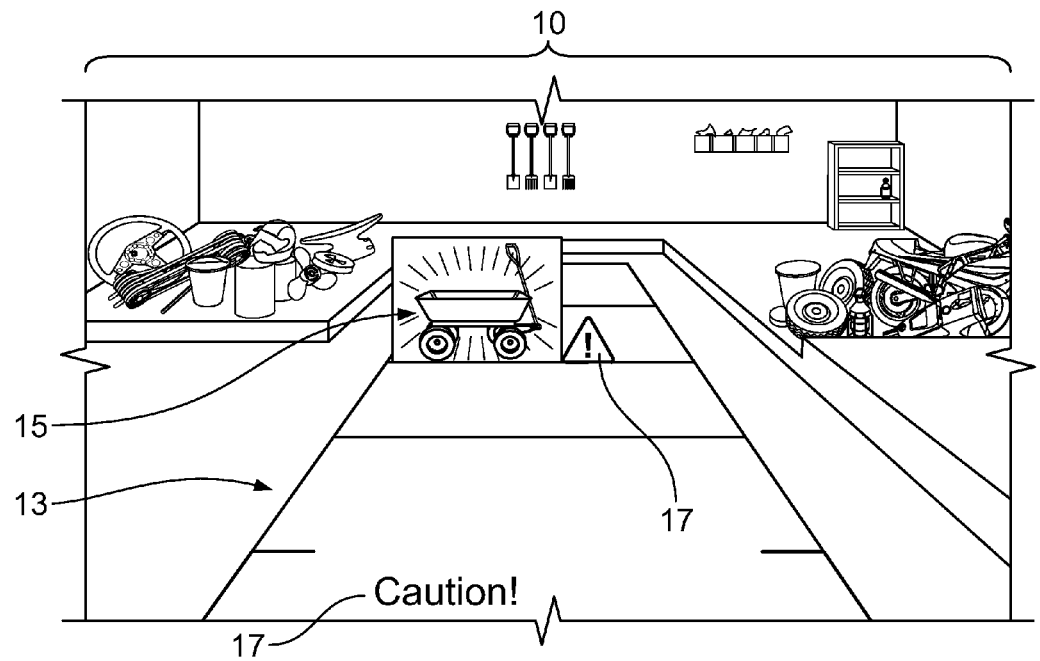
FIG. 2c illustrates the object in the vehicle path, which is overlaid on the image, highlighted on the image

In another illustrative variation which also involves the situation in which a vehicle 12 has pulled out of a familiar parking space 10, such as a homeowner's garage, by a sufficient distance from where it was previously backed in and parked. Several first images 20 of the familiar parking space 10 are created by imaging hardware 11 aboard the vehicle at several angles and distances as the vehicle 12 moves away from the familiar parking space 10, thereby obtaining several first images 20 having multiple perspectives of the familiar parking space 10. A space where the vehicle may be parked in the familiar space is overlaid on each of the first images 20, for example, as illustrated in FIG. 2a. For purposes of this illustrative variation, these overlays are referred to as the vehicle path 13. At least one of the first images 20 is then stored in a storage device 16 which may be onboard the vehicle 12. Alternatively, the first images 20 may be stored at a remote location such as, but not limited to, a cloud server accessible by telecommunication devices onboard the vehicle. When the vehicle's position and movement indicate that the vehicle 12 is backing into the familiar parking space 10 or that the vehicle 12 is in substantially the same position where the first images 20 were created, the imaging hardware 11 aboard the vehicle 12 automatically and continuously creates a set of second images 30 of the familiar parking space 10, for example as illustrated in FIG. 2b. These second images 30 are then continuously correlated to the first images 20 and corrected for displacement, such that a vehicle path 13 which has been overlaid on at least one of the first images 20 can be reasonably correlated to at least one of the second images 30. A controller 14 actively compares the second images 30 to the first images 20 in order to determine whether there is an object 15 in the vehicle path 13. If there is at least one object 15 in the vehicle path 13 and there is a display screen which is in communication with the controller 14, the at least one object 15 may be highlighted on the display screen and displayed to the pilot of the vehicle 12 and may be accompanied by audible, physical or other sensory notifications 17 of the same, for example as illustrated in FIG. 2c. In a number of illustrative variations, a first and/or second amount of image data may be produced in lieu of a first and/or second image or in addition to a first and/or second image. The vehicle path 13 may be represented within the first and/or second amount of image data as well as the first and/or second image.

In a number of illustrative variations, the imaging hardware 11 may be induced to create an image and/or image data in light of vehicle 12 position and/or movement and/or position and/or movement data. Imaging hardware 11 may include but is not limited to devices which utilize radar, ultrasonic imaging, light detection and ranging, photographs and other types of optical and acoustic sensing which are known in the art. All of these imaging hardware devices may be used in stereo or higher multiplicities and also as solo devices for imaging and sensing. These devices may produce images and/or image data including but not limited to image depth information, color, and/or heat information. Light sensitive imaging hardware may also use night vision technology and/or other vision aiding or amplifying devices. Any image or image data produced by the imaging hardware 11 may be subject to filtering and/or processing and/or modification of any type by a controller 14.

Figure 3:
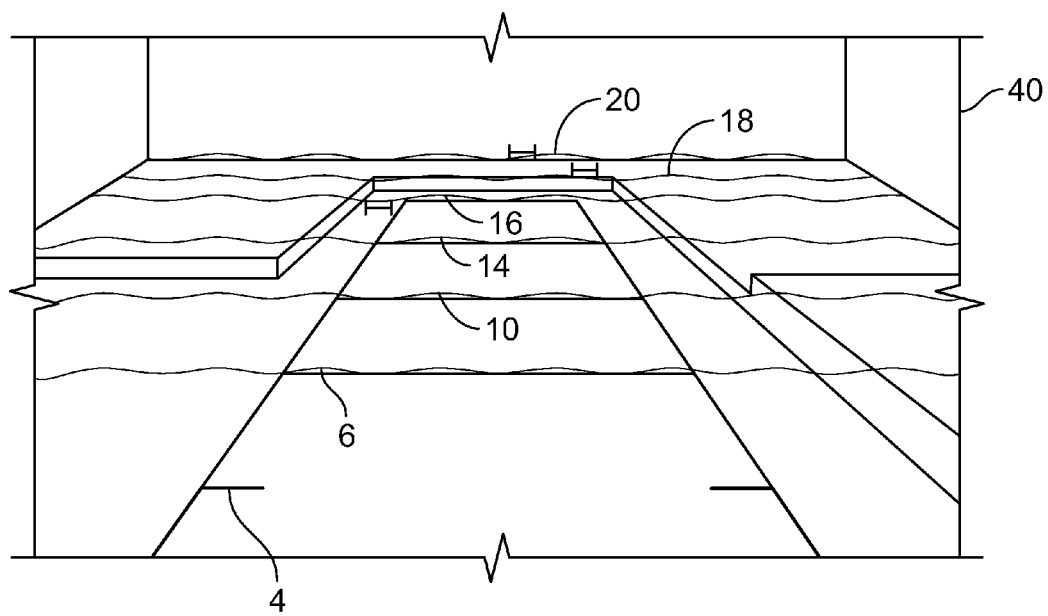
FIG. 3 illustrates a depth mapping overlaid on an image

In a number of non-limiting illustrative variations, a depth map may be correlated to an image as show in FIG. 3.

A number of illustrative variations include a storage device 16 which may be aboard the vehicle 12 and which is capable of storing at least one image and/or image data. This storage device 16 may store an image and/or image data on a storage medium of a magnetic type, optical type, semiconductor type and/or any other type which is known in the art.

In a number of illustrative variations include a method of expressing a notification 17 which is able to be sensed. This notification 17 may be of the visible type, audible type, physical type and/or any type which may be sensed by living organism or inanimate sensor. This notification 17 may be expressed according to its sensory focus by a display screen, speakers, gyrating or vibrating motors or any number of methods and/or products which may be used to produce an output that may be sensed.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: determining if objects are in a vehicle path comprising: (a) producing at least one of a first image and/or first amount of image data for an area; (b) determining a vehicle path and overlaying it on the at least one first image and/or representing it within the first amount of image data; (c) producing at least one of a second image and/or second amount of image data for the area; (d) using the at least one first image and/or first amount of image data and correlating it to the at least one second image and/or second amount of image data to determine objects which may be displaced in the at least one second image and/or second amount of image data; (e) determining whether objects which are displaced are in the vehicle path; (f) producing a notification of objects in the vehicle path via capable hardware based upon the outcome of the determining whether objects which are displaced are in the vehicle path.

Variation 2 may include a method as set forth in Variation 1 wherein the first image or first amount of image data is stored in a storage device which is capable of storing the at least one image or image data.

Variation 3 may include a method as set forth in any of Variations 1-2 wherein the second image or second amount of image data is stored in a storage device which is capable of storing at least one image or image data.

Variation 4 may include a method as set forth in any of Variations 1-3 wherein (a) is triggered by the vehicle's position with regard to the area.

Variation 5 may include a method as set forth in any of Variations 1-4 wherein step a is triggered by the vehicle's movement with regard to the area.

Variation 6 may include a method as set forth in any of Variations 1-5 wherein step c is triggered by the vehicle's position with regard to the area.

Variation 7 may include a method as set forth in any of Variations 1-6 wherein step c is triggered by the vehicle's movement with regard to the area.

Variation 8 may include a method as set forth in any of Variations 1-7 wherein the production of the notification of step f involves the use of hardware which is onboard the vehicle.

Variation 9 may include a method as set forth in any of Variations 1-8 wherein the at least one first image and/or the at least one second image has depth data overlaid thereon.

Variation 10 may include a method as set forth in any of Variations 1-9 wherein the first amount of image data and/or the second amount of image data has/have depth data represented therein.

Variation 11 may include a method as set forth in any of Variation 2 wherein the vehicle's position is determined by a global positioning satellite.

Variation 12 may include a method as set forth in any of Variation 4 wherein the vehicle's position is determined by a global positioning satellite.

Variation 13 may include a method comprising: providing a vehicle; providing imaging hardware; providing a storage device which is capable of storing at least one image or image data; providing a controller for correlating or comparing images or image data; positioning the vehicle in an area such that the imaging hardware may create image(s) and/or image data which is relative to the vehicle's position and which is sufficiently reproducible if the imaging hardware were to perform the image(s) and/or image data creation while the vehicle is in a moderately similar position relative to the area; using the imaging hardware to create at least one first image or image data; using the imaging hardware to create at least one second image or image data; using a controller to correlate or compare the at least one first image or image data to the at least one second image or image data to detect a difference between the at least one first image or image data to the at least one second image or image data; producing a sensory notification of objects in the vehicle path via capable hardware based upon the detection of a difference between the at least one first image or image data to the at least one second image or image data.

Variation 14 may include a method as set forth in Variation 13 wherein the first image or image data is stored in the storage device which is capable of storing at least one image or image data.

Variation 15 may include a method as set forth in any of Variations 13-14 wherein the second image or image data is stored in the storage device which is capable of storing at least one image or image data.

Variation 16 may include a method as set forth in any of Variations 13-15 wherein the imaging hardware is induced to create an image or image data in light of at least one of vehicle position or movement or position or movement data.

Variation 17 may include a method as set forth in any of Variations 13-16 wherein the imaging hardware is onboard the vehicle.

Variation 18 may include a method as set forth in any of Variations 13-17 wherein the hardware for producing a sensory notification is onboard the vehicle.

Variation 19 may include a method as set forth in any of Variations 13-18 wherein the controller is onboard the vehicle.

Variation 20 may include a method as set forth in any of Variations 13-19 wherein the storage device is onboard the vehicle.

The above description of select variations within the scope of the invention is merely illustrative in nature and, thus, variations or variants thereof are not to be regarded as a departure from the spirit and scope of the invention.

What is claimed is:

1. A method comprising:
    determining if objects are in a vehicle path comprising:
        (a) producing at least one of a first image and/or first amount of image data for an area;
        (b) determining a vehicle path and overlaying it on the at least one first image and/or representing it within the first amount of image data;
        (c) producing at least one of a second image and/or second amount of image data for the area;
        (d) using the at least one first image and/or first amount of image data and correlating it to the at least one second image and/or second amount of image data to determine objects which may be displaced in the at least one second image and/or second amount of image data;
        (e) determining whether objects which are displaced are in the vehicle path;
        (f) producing a notification of objects in the vehicle path via capable hardware based upon the outcome of the determining whether objects which are displaced are in the vehicle path.

2. The method of claim 1 wherein the first image or first amount of image data is stored in a storage device which is capable of storing the at least one image or image data.

3. The method of claim 2 wherein the vehicle's position is determined by a global positioning satellite.

4. The method of claim 1 wherein the second image or second amount of image data is stored in a storage device which is capable of storing at least one image or image data.

5. The method of claim 1 wherein step a is triggered by the vehicle's position with regard to the area.

6. The method of claim 5 wherein the vehicle's position is determined by a global positioning satellite.

7. The method of claim 1 wherein step a is triggered by the vehicle's movement with regard to the area.

8. The method of claim 1 wherein step c is triggered by the vehicle's position with regard to the area.

9. The method of claim 1 wherein step c is triggered by the vehicle's movement with regard to the area.

10. The method of claim 1 wherein the production of the notification of step f involves the use of hardware which is onboard the vehicle.

11. The method of claim 10 wherein the first image or image data is stored in the storage device which is capable of storing at least one image or image data.

12. The method of claim 10 wherein the second image or image data is stored in the storage device which is capable of storing at least one image or image data.

13. The method of claim 10 wherein the imaging hardware is induced to create an image or image data in light of at least one of vehicle position or movement or position or movement data.

14. The method of claim 10 wherein the imaging hardware is onboard the vehicle.

15. The method of claim 10 wherein the hardware for producing a sensory notification is onboard the vehicle.

16. The method of claim 10 wherein the controller is onboard the vehicle.

17. The method of claim 10 wherein the storage device is onboard the vehicle.

18. The method of claim 1 wherein the at least one first image and/or the at least one second image has depth data overlaid thereon.

19. The method of claim 1 wherein the first amount of image data and/or the second amount of image data has/have depth data represented therein.

20. A method comprising:
    providing a vehicle;
    providing imaging hardware;
    providing a storage device which is capable of storing at least one image or image data;
    providing a controller for correlating or comparing images or image data;
    positioning the vehicle in an area such that the imaging hardware may create image(s) and/or image data which is relative to the vehicle's position and which is sufficiently reproducible if the imaging hardware were to perform the image(s) and/or image data creation while the vehicle is in a moderately similar position relative to the area;
    using the imaging hardware to create at least one first image or image data;
    using the imaging hardware to create at least one second image or image data;
    using a controller to correlate or compare the at least one first image or image data to the at least one second image or image data to detect a difference between the at least one first image or image data to the at least one second image or image data;
    producing a sensory notification of objects in the vehicle path via capable hardware based upon the detection of a difference between the at least one first image or image data to the at least one second image or image data.

* * * * *